United States Patent
Di Francescantonio et al.

(10) Patent No.: US 11,388,065 B1
(45) Date of Patent: Jul. 12, 2022

(54) METHOD FOR REPRESENTING OBJECTS OF A NETWORK IN A GUIS

(71) Applicant: Nozomi Networks Sagl, Mendrisio (CH)

(72) Inventors: Paolo Di Francescantonio, Castronno (IT); Alessandro Cavallaro Corti, Varese (IT); Moreno Carullo, Gavirate (IT); Andrea Carcano, San Francisco, CA (US)

(73) Assignee: NOZOMI NETWORKS SAGL, Mendrisio (CH)

( * ) Notice: Subject to any disclaimer, the term of this patent is extended or adjusted under 35 U.S.C. 154(b) by 0 days.

(21) Appl. No.: 17/187,821

(22) Filed: Feb. 28, 2021

(51) Int. Cl.
*H04L 41/22* (2022.01)
*H04L 43/045* (2022.01)
*H04L 41/14* (2022.01)

(52) U.S. Cl.
CPC ............ *H04L 41/22* (2013.01); *H04L 41/145* (2013.01); *H04L 43/045* (2013.01)

(58) Field of Classification Search
CPC ...... H04L 41/22; H04L 41/145; H04L 43/045
See application file for complete search history.

(56) References Cited

U.S. PATENT DOCUMENTS

2017/0084064 A1* 3/2017 Glover .................. H04L 43/045

OTHER PUBLICATIONS

Bastami, Esmaeil et al. "A gravitation-based link prediction approach in social networks." Swarm Evol. Comput. 44: 176-186. (Year: 2019).*

(Continued)

*Primary Examiner* — John M Macilwinen
(74) *Attorney, Agent, or Firm* — DeFrancesco Lee LLC; Jason L DeFrancesco (57) ABSTRACT

The present invention relates to a method for representing objects of a network in a GUI comprising allocating all of the objects of the network as respective nodes in a two-dimensional space, assessing the gravitational forces of the nodes, and positioning the objects as graph in the GUI based on the gravitational forces of the nodes, wherein the allocating comprises enclosing all of the nodes in a single base square, dividing the single base square in a plurality of $1^{st}$-level squares, each of the $1^{st}$-level squares in a plurality of $2^{nd}$-level squares, iterating the subdividing of each of the $(n)^{th}$-level squares in a plurality of $(n+1)^{th}$-level squares, wherein the subdividing is made for the $(n)^{th}$-level squares provided with two or more of the nodes, wherein the assessing comprises selecting as source square one of the squares starting from the highest level, selecting and as receiver square one the squares starting from the highest level, evaluating if the source square and the receiver square are distant, computing the forces acting on the receiver square from the source square, if the source square and the receiver square are evaluated as distant or if the source square and the receiver square are evaluated as not distant and have respectively no lower level squares nested, sub-selecting as source square or as receiver square one of the squares of a lower level if the source square and the receiver square are evaluated as not distant, wherein the sub-selecting is iterated for all squares at same level, wherein the assessing is iterated for all the the possible combinations of source and receiver squares at 1st level, and wherein the assessing further comprises distributing, by the computerized data processing unit, the forces acting on each of the receiver square to all of the nodes in the corresponding receiver square defining the gravitational forces of all of the nodes.

19 Claims, 2 Drawing Sheets

(56) References Cited

OTHER PUBLICATIONS

Liu, Gang et al. "Analysis of network traffic flow dynamics based on gravitational field theory." Chinese Physics B 22: 068901. (Year: 2013).*

Yin, Guisheng et al. "An approach of community evolution based on gravitational relationship refactoring in dynamic networks." Physics Letters A 381: 1349-1355. (Year: 2017).*

Jacomy, Mathieu et al. "ForceAtlas2, a Continuous Graph Layout Algorithm for Handy Network Visualization Designed for the Gephi Software." PLoS ONE 9 (Year: 2014).*

Binder, Patricia et al. "Gravitational Clustering: A Simple, Robust and Adaptive Approach for Distributed Networks." Signal Process. 149: 36-48. (Year: 2018).*

* cited by examiner

METHOD FOR REPRESENTING OBJECTS OF A NETWORK IN A GUIS

FIELD OF INVENTION

The present invention relates to the field of graphic user interface (GUI). In particular, the present invention relates to a method for representing objects of a network in a GUI.

BACKGROUND ART

A graphical user interface (GUI) is a form of user interface that allows users to interact with electronic devices through graphical icons and indicator instead of text-based user interfaces. Designing the visual composition and temporal behavior of a GUI is an important part of software application programming in the area of human-computer interaction. Its goal is to enhance the efficiency and ease of use for the underlying logical design of a stored program, while the actions in a GUI are usually performed through direct manipulation of the graphical elements.

In particular, the term GUI usually refers to the visible graphical interface features of an application. Users may interact with information by manipulating visual widgets that allow for interactions appropriate to the kind of data they hold. The widgets of a well-designed interface are selected to support the actions necessary to achieve the goals of users.

In the field of the management of computer network infrastructures, of great importance is the use of GUI to simplify the representation, at user level, of the multitude of connections and data exchanges involved. In particular, in order to monitor and protect large modern OT/IOT/IT computer networks one fundamental prerequisite is the need to ensure a good network visibility, in other words there is the need to have a clear visibility of all the computers/devices present in the network and of all the communications that happens among them.

A kind of GUI employed to ensure a proper network visibility is the network graph, wherein each computer or device in the network is represented as a node, and the communications among them are represented as links that connects the nodes. In a network graph, in order to have a clear visualisation of all components, there is the need to dispose the nodes in such a way to be well spaced to each other, wherein the nodes that are directly connected by a link should be placed closed to each other and if a new node or link appears in a new iteration the position of other nodes should not change in a substantive way.

A well-known approach to compute the node positions such as to fit the above properties is to use a pseudo-physical simulation. Each node is treated as a point particle with a given mass (m), and generate a pseudo-gravitational repulsive force that acts on all other nodes. Each link is treated as a spring with a given elastic constant that attract connected nodes. An arbitrary initial position is assigned to the nodes at the initial time to and then the position of the nodes at the time $t_1=t_0+dt$ is computed taking into account the Newton's dynamics laws applying to each node the gravitational and spring forces. Once the new positions are obtained the operation is repeated computing the positions at time $t_2=t_1+dt$, and so on for each new iteration which follows. If dt is enough small and if the physics simulation is conducted using a stable numerical scheme the nodes position will converge to a relatively stable condition after a number of iterations that typically depends on the number of nodes.

A naive approach to evaluate the gravitational forces consists in iterating, for each node (i), on all the other nodes (j) and compute the force that each of the other node (j) generates on the node (i). In other words, the node (i) for which the force is to be computed is considered as the receiver that receives the forces produced on it by all the other nodes that act as sources. This approach has a complexity of order $O(N^2)$ (being N the number of nodes) and cannot be applied in realistic cases since as soon as N increase it requires far too much resources in each iteration. Besides each force calculation require the evaluation of power, square root and trigonometric functions, and so is computationally expensive, therefore it is important to try to reduce as much as possible the number of force evaluations required.

A further approach, which moves towards the aforementioned need, is the Barnes-Hut method that permits to reduce the complexity to $O(N*Log(N))$. The central idea of this method is still to iterate on each receiver but putting together several sources considering them as a single source. In this way for each group of sources assembled together, a single evaluation of the gravitational force is required, instead of having a single evaluation for each node of the group.

The Barnes-Hut method reduces the complexity by removing the iteration on each of the sources and replacing with an iteration on a group of sources. In this way several source masses that are close enough, can possibly be considered as a single mass, reducing therefore the number of force evaluation required. Anyway, each source, or mass, can be interpreted both as a source and as a receiver, therefore the overall calculation requires to perform a double nested iteration, with a great amount of computational resources required.

It would therefore be desirable to represent objects and connections of a network in a way to be comprehensible from a user side. In particular, it would be desirable to provide a representation of a network graph GUI which involves a small amount of computational resources.

BRIEF DESCRIPTION OF THE INVENTION

The object of the present invention is to provide a method for representing objects and their network connection capable of minimizing the aforementioned drawbacks. In particular, it would be desirable to have a method capable to represent an overall network in each iteration using few computational resources.

According to the present invention is described, therefore, a method for representing objects of a network in a GUI.

The method for representing objects of a network in a GUI comprises:
  allocating all of the objects of the network as respective nodes in a two-dimensional space;
  assessing the gravitational forces of the nodes; and
  positioning the objects as graph in the GUI based on the gravitational forces of the nodes;
wherein the allocating comprises:
  defining, by a computerized data processing unit, the random initial position of all of the nodes assigning to each of the nodes the respective coordinates along the x and y axes in the two-dimensional space;
  enclosing, by the computerized data processing unit, all of the nodes in a single base square;
  dividing, by the computerized data processing unit, the single base square in a plurality of $1^{st}$-level squares, wherein the plurality of $1^{st}$-level squares consists of four level squares having the same dimensions;

subdividing, by the computerized data processing unit, each of the $1^{st}$-level squares in a plurality of $2^{nd}$-level squares, wherein the subdividing is made for the $1^{st}$-level squares provided with two or more of the nodes and wherein each of the plurality of $2^{nd}$-level squares consists of four level squares having the same dimensions;

iterating, by the computerized data processing unit, the subdividing of each of the $(n)^{th}$-level squares in a plurality of $(n+1)^{th}$-level squares, wherein the subdividing is made for the $(n)^{th}$-level squares provided with two or more of said nodes and wherein each of the plurality of $(n+1)^{th}$-level squares consists of four level squares having the same dimensions;

wherein the assessing comprises:

selecting, by the computerized data processing unit, as source square one of the squares starting from the highest level;

selecting, by the computerized data processing unit, as receiver square one of the squares starting from the highest level;

evaluating, by the computerized data processing unit, if the source square and the receiver square are distant, according to one or more predefined criteria;

computing, by the computerized data processing unit, the forces acting on the receiver square from the source square, if the source square and the receiver square are evaluated as distant or if the source square and the receiver square are evaluated as not distant and have respectively no lower level squares nested;

sub-selecting, by the computerized data processing unit, as source square or as receiver square one of the squares of a lower level if the source square and the receiver square are evaluated as not distant, wherein the sub-selecting is iterated for all of the squares at same level, wherein said sub-selecting is iterated for all combinations of said squares at same level as source and as receiver for all of said levels;

wherein the assessing is iterated for all combinations of squares at the Pt level as source and as receiver; and wherein the assessing further comprises distributing, by the computerized data processing unit, the forces acting on each of the receiver square to all of the nodes in the corresponding receiver square defining the gravitational forces of all of the nodes.

In a further embodiment, the predefined criteria comprise the evaluation of the overlap, wherein the squares are considered not distant if they overlap to each other.

In a further embodiment, the predefined criteria comprise the evaluation of the edges, wherein the squares are considered not distant if they have at least an edge in common.

In a further embodiment, the predefined criteria comprise the evaluation of the vertexes, wherein the squares are considered not distant if they have at least a vertex in common.

In a further embodiment, the forces acting on each of the receiver square are the two components of the force generated along the x and y axes in the two-dimensional space, computed as:

$$Fx=GMs*(xs-xr)/d^3$$

$$Fy=GMs*(ys-yr)/d^3$$

wherein:
Ms is the source mass,
xs, ys are the coordinates of source center of mass,
xr, yr are the coordinate of receiver center of mass, d is the distance between the source center of mass and the receiver center of mass,
G is a predefined gravitational constant.

In a further embodiment, the distributing comprises for each of the node defining the gravitational forces as the forces acting on the corresponding receiver square multiplied by the mass of the node.

In a further embodiment, the gravitational forces for each of the node are defined starting from the receiver square at lowest level and going up to the parent receiver square at highest level, wherein the gravitational forces of the node are calculated as sum of the forces acting on each of the corresponding receiver square from the lowest level to the highest level multiplied by the mass of the node.

In a further embodiment, the sub-selecting comprises selecting as lower level square the one between source square and receiver square at higher level, if both source square and receiver square have lower level squares nested and are not at the same level.

In a further embodiment, the sub-selecting comprises selecting as lower level square the one between source square and receiver square having lower level squares nested if the other has no lower level squares nested.

In a further embodiment, the sub-selecting comprises selecting as lower level square the one between source square and receiver square containing a smaller number of the nodes, if both source square and receiver square have lower level squares nested and are at the same level.

In a further embodiment, the sub-selecting comprises selecting as lower level square the receiver square, if both source square and receiver square have lower level squares nested and contain the same number of the nodes.

In a further embodiment, positioning the objects in the GUI is based on the gravitational forces of the nodes and on the link forces between couples of the nodes.

In a further embodiment, the link forces are computed for each of the couples as:

$$Flx=K(xb-xa)$$

$$Fly=K(yb-ya)$$

and $$Flx=K(xa-xb)$$

$$Fly=K(ya-yb)$$

respectively for an "a" node of the couple and for a "b" node of the couple, wherein:
K is a predefined elastic constant.

In a further embodiment, positioning the objects in the GUI is based on the gravitational forces of the nodes and on the central forces attracting the nodes toward the origin of the graph.

In a further embodiment, central forces are computed for each of the nodes as:

$$Fcx=C*x$$

$$Fcy=C*y$$

wherein:
C is a predefined constant.

In a further embodiment, positioning the objects in the GUI is based on the gravitational forces of the nodes and on the damping forces of the nodes.

In a further embodiment, the damping forces are computed for each of the nodes as:

$$Fdx=D*Vx$$

$$Fdy=D*Vy$$

wherein:
Vx is the velocity of the node along said x axis,
Vy is the velocity of the node along said y axis,
D is a predefined damping constant.

In a further embodiment, positioning the objects in the GUI is based on the total forces of each of the nodes as sum of the gravitational forces, of the link forces, of the central forces, of the damping forces computed for each of the nodes as:

$$Ftx=Fgx+Flx+Fcx+Fdx$$

$$Fty=Fgy+Fly+Fcy+Fdy$$

In a further embodiment, positioning the objects in the GUI is computed in a predetermined time interval at each predetermined instant, and wherein a new position of all of the nodes in the instant is determined using the Verlet-Velocity Algorithm based on the total forces.

DESCRIPTION OF THE FIGURES

These and further features and advantages of the present invention will become apparent from the disclosure of the preferred embodiments, illustrated by way of a non-limiting example in the accompanying figures, wherein.

DETAILED DESCRIPTION OF THE INVENTION

The present invention relates to method for representing objects of a network in a GUI.

The method according to the present invention finds a useful application in any kind of physical infrastructures or automation systems connected in a network, in particular in industrial automation systems, such as industrial processes for manufacturing production, industrial processes for power generation, infrastructures for distribution of fluids (water, oil and gas), infrastructures for the generation and/or transmission of electric power, infrastructures for transport management. Moreover, it finds useful application with all the technology environments, including Information Technology (IT), Operation Technology (OT) and Internet of Things (IoT).

Looking at the overall calculation of gravitational forces acting on a set on n masses, each mass can be interpreted both as a source and as a receiver. With the standard naïve approach, the mass itself can be considered as a receiver and all the other masses are the sources that generate a force on the receiver. The overall calculation requires therefore to perform a double nested iteration.

The method according to the present invention reduces the complexity by removing the iteration on each node putting together either the sources and the receivers when evaluating the forces. In this way several source masses that are close enough, can possibly be considered as a single mass, reducing therefore the number of force evaluation required. At same time, several receiver masses that are close enough, can possibly be considered as a single mass, further reducing the number of force evaluation required.

The method will be described in the following taking into account two simple examples but, of course, it can be scaled to any kind of complexity.

Figure 1:
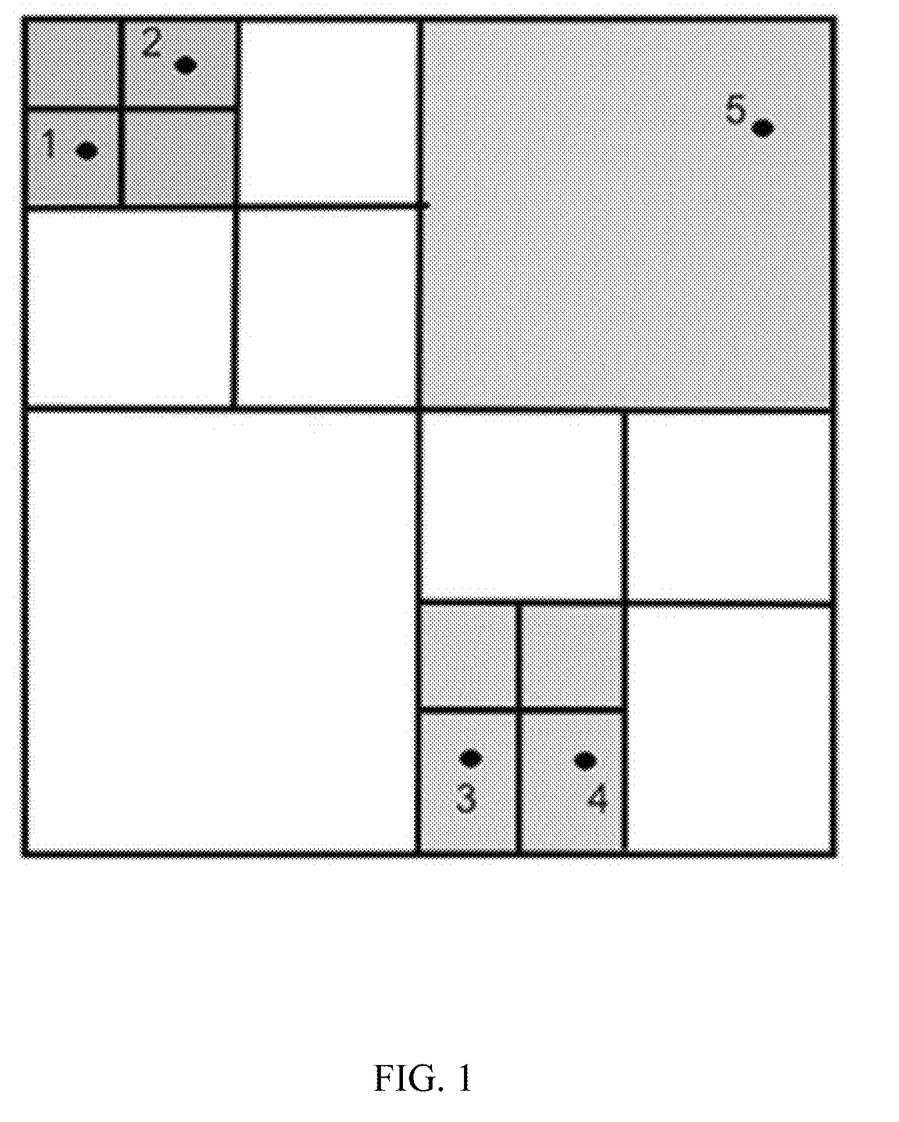
FIG. 1 shows a quadtree of a first example defined according to the present invention.

FIG. 1 illustrates a first example, to be processed according to the method of the present invention, which comprises five nodes numbered from 1 to 5. These nodes represent corresponding objects in a network.

Taking into account the naïve approach, in consideration of the five nodes for each of them all the other four nodes have to be considered resulting in a complexity of twenty forces evaluation.

Taking into account the Barnes-Hut approach, analyzing each of the five nodes and grouping the source masses, the node numbered as 1 requires three forces evaluation (node numbered as 2, group of node numbered as 3 and node numbered as 4, node numbered as 5), the node numbered as 2 requires three forces evaluation (node numbered as 1, group of node numbered as 3 and node numbered as 4, node numbered as 5), the node numbered as 3 requires three forces evaluation (group of node numbered as 1 and node numbered as 2, node numbered as 4, node numbered as 5), the node numbered as 4 requires three forces evaluation (group of node numbered as 1 and node numbered as 2, node numbered as 3, node numbered as 5) and the node numbered as 5 requires two forces evaluation (group of node numbered as 1 and node numbered as 2, group of node numbered as 1 and node numbered as 2). Resulting in a complexity of sixteen forces evaluation.

The method for representing objects of a network in a GUI according to the present invention allows to reduce more the complexity just to ten forces evaluation.

The method comprises first allocating all of the objects of the network as respective nodes in a two-dimensional space. FIG. 1 illustrates such allocation that will be described in greater details in the following.

The allocating comprises defining, by a computerized data processing unit, the random initial position of all of the nodes assigning to each of the nodes the respective coordinates along the x and y axes in the two-dimensional space. Subsequently, enclosing, by the computerized data processing unit, all of the nodes in a single base square, as represented in the edges of FIG. 1.

The single base square is approached by dividing it in a plurality of $1^{st}$-level squares, again by a computerized data processing unit. Such a plurality of $1^{st}$-level squares consists of four squares having the same dimensions. In particular, the $1^{st}$-level squares are nested in the base square so that they represent children of the same.

After that, the allocating comprises subdividing, by the computerized data processing unit, each of the $1^{st}$-level squares in a plurality of $2^{nd}$-level squares, wherein the subdividing is made for the $1^{st}$-level squares provided with two or more of the nodes. Such a plurality of $2^{nd}$-level squares consists of four squares having the same dimensions.

To simplify the presentation and identification the following notation will be adopted. Each child square is defined by a number based on the position with respect to the parent square, wherein notation 1 defines the square in the top left position, notation 2 defines the square in the top right position, the notation 3 defines the square in the bottom right position and notation 4 defines the square in the bottom left position. Moreover, the notation of the parent squares will be maintained at each level. Therefore, the $1^{st}$-level squares are identified with the notation 1, 2, 3 and 4 starting with the $1^{st}$-level squares on the top left going clockwise towards bottom left.

By considering the aforementioned notation, square 2 and square 4 will not be subdivided anymore, since the first one contains just a single node, i.e. node numbered as 5, while the second one contains no nodes. On the contrary, each of the square 1 and square 3 will be subdivided, as described, in four more $2^{nd}$-level squares having the same dimensions. In particular, the $2^{nd}$-level squares are nested in the respective $1^{st}$-level squares so that they represent children of the same. Therefore, the $2^{nd}$-level squares are identified with the notation 1-1, 1-2, 1-3 and 1-4, for the $1^{st}$-level square with the notation 1, and with the notation 3-1, 3-2, 3-3, 3-4, for the $1^{st}$-level square with the notation 3, again starting with the $2^{nd}$-level squares on the top left going clockwise towards bottom left. The nodes being enclosed in the $2^{nd}$-level square with the notation 1-1, i.e. nodes numbered as 1 and 2, and in the $2^{nd}$-level square with the notation 3-4, i.e. nodes numbered as 3 and 4.

By iterating the subdividing, each of the $(n)^{th}$-level squares is subdivided in a plurality of $(n+1)^{th}$-level squares, and the iteration is done until the $(n)^{th}$-level squares are provided with two or more nodes.

Preferably, also the plurality of $(n+1)^{th}$-level squares consists of four level squares having the same dimensions. In particular, the $(n+1)^{th}$-level squares are nested in the respective $(n)^{th}$-level squares so that they represent children of the same, the latter consisting in turn of four level squares having the same dimensions nested in the respective $(n-1)^{th}$-level squares so that they represent children of the same, and so on.

In the embodiment illustrated in FIG. 1, the iteration involves only the further subdividing of the $2^{nd}$-level square with the notation 1-1 and the $2^{nd}$-level square with the notation 3-4, being the only $2^{nd}$-level squares provided with two nodes. Therefore, square 1-1 and square 3-4 will be subdivided, as described, each in four more $3^{rd}$-level squares having the same dimensions. In particular, the $3^{rd}$-level squares are nested in the respective $2^{nd}$-level squares so that they represent children of the same. Therefore, the $3^{rd}$-level squares are identified with the notation 1-1-1, 1-1-2, 1-1-3 and 1-1-4, for the $2^{nd}$-level square with the notation 1-1, and with the notation 3-4-1, 3-4-2, 3-4-3, 3-4-4, for the $2^{nd}$-level square with the notation 3-4, again starting with the $3^{rd}$-level squares on the top left going clockwise towards bottom left. The nodes being enclosed in the $3^{rd}$-level square with the notation 1-1-2, i.e. node numbered as 2, in the $3^{rd}$-level square with the notation 1-1-4, i.e. node numbered as 1, in the $3^{rd}$-level square with the notation 3-4-3, i.e. node numbered as 4, and in the $3^{rd}$-level square with the notation 3-4-4, i.e. node numbered as 3.

In this way, the allocating defines a quadtree, as illustrated in FIG. 1, of all nodes from 1 to 5 representing the objects of the network. In particular, the quadtree as defined is not a complete quadtree since not all the parent squares have exactly four nested children squares, the nesting depending of the nodes contained as explained.

After the allocating, the method comprises assessing the gravitational forces of the nodes.

The assessing comprises selecting, by the computerized data processing unit, as source square one of said squares starting from the highest level. Subsequently, the assessing comprises selecting, by the computerized data processing unit, as receiver square one of said squares starting from the highest level. In particular, the assessing is iterated for all of the squares at same level.

To simplify the below description, source squares will be indicated with S followed by the notation that identifies them in the aforementioned quadtree, while receiver squares will be indicated with R followed by the notation that identifies them in the aforementioned quadtree.

Therefore, without taking into account the single base square, the source and the receiver are selected from the $1^{st}$-level squares, selecting all possible combinations of source and receiver squares at $1^{st}$ level as previously described. In the present example, the selecting starts with the S1 and R1, then with S2-R1, S3-R1, S4-R1, and the S1-R2, S2-R2, S3-R3 and so on until S4-R4.

After selecting, evaluating, by the computerized data processing unit, if the source square and the receiver square are distant is performed. according to one or more predefined criteria.

The evaluation of the distance is made according to one or more predefined criteria. Considering the generated quadtree, it is necessary to define a criterion, or more criteria, that permits to understand when a square that contains sources is enough distant from a square that contains the receivers in such a way that the collapsing of source and receiver can be done with a good approximation in the results.

The predefined criteria comprise the evaluation of the overlap, wherein the squares are considered not distant if they overlap to each other. Moreover, the predefined criteria comprise the evaluation of the edges, wherein the squares are considered not distant if they have at least an edge in common. Furthermore, the predefined criteria comprise the evaluation of the vertexes, wherein the squares are considered not distant if they have at least a vertex in common. Depending on the accuracy desired, such criteria can be taken into consideration jointly, i.e. considering all criteria, or separately, i.e. considering one or more criteria. Moreover, further criteria herewith not described can be considered.

In the present example, the aforementioned criteria will be considered jointly.

The results of the distance evaluation between source and receiver will trigger the subsequent computing or sub-selecting. In particular, if the source square and the receiver square are evaluated as distant or if the source square and the receiver square are evaluated as not distant but have respectively no lower level squares nested a subsequent computing, by the computerized data processing unit, of the forces acting on the receiver square from the source square is made. On the contrary, if the source square and the receiver square are evaluated as not distant, a sub-selecting, by the computerized data processing unit, as source square or as receiver square one of the squares of a lower level is made, wherein the sub-selecting is again iterated for all of the squares at same level.

The sub-selecting, and the selecting as well, can be done randomly or according to one or more criteria of selection. A criterion of selection may comprise selecting as lower level square the one between source square and receiver square at higher level, if both source square and receiver square have lower level squares nested and are not at the same level. A further criterion may comprise selecting as lower level square the one between source square and receiver square having lower level squares nested if the other has no lower level squares nested. Moreover, a criterion may comprise selecting as lower level square the one between source square and receiver square containing a smaller number of the nodes, if both source square and receiver square have lower level squares nested and are at the same level. Finally, a criterion may comprise selecting as lower level square the receiver square, if both source square and receiver square have lower level squares nested and contain the same number of the nodes. Such criteria of selection can be taken into consideration jointly, i.e. considering all criteria of selection, or separately, i.e. considering one or more criteria of selection. Moreover, further criteria of selection herewith not described can be considered.

In the present example, the aforementioned criteria of selection will be considered jointly.

In the following, a summary of all iteration for the example in FIG. 1 is made.

1. S=1, R=1 -> not distant: sub-selecting the receiver
    a. S=1, R=1-1 -> not distant: sub-selecting the source
        i. S=1-1, R=1-1 -> not distant: sub-selecting the receiver
            1. S=1-1, R=1-1-1 -> empty: skip
            2. S=1-1, R=1-1-2 -> not distant: sub-selecting the source
                a. S=1-1-1, R=1-1-2 -> empty: skip
                b. S=1-1-2, R=1-1-2 -> same, no child: skip
                c. S=1-1-3, R=1-1-2 -> empty: skip
                d. S=1-1-4, R=1-1-2 -> no child: computing forces
            3. S=1-1, R=1-1-3 -> empty: skip
            4. S=1-1, R=1-1-4 -> not distant: sub-selecting the source
                a. S=1-1-1, R=1-1-4 -> empty: skip
                b. S=1-1-2, R=1-1-4 -> no child: computing forces
                c. S=1-1-3, R=1-1-4 -> empty: skip
                d. S=1-1-4, R=1-1-4 -> same, no child: skip
        ii. S=1-2, R=1-1 -> empty: skip
        iii. S=1-3, R=1-1 -> empty: skip
        iv. S=1-4, R=1-1 -> empty: skip
    b. S=1, R=1-2 -> empty: skip
    c. S=1, R=1-3 -> empty: skip
    d. S=1, R=1-4 -> empty: skip
2. S=2, R=1 -> not distant: sub-selecting the receiver
    a. S=2, R=1-1 -> distant: computing forces
    b. S=2, R=1-2 -> empty: skip
    c. S=2, R=1-3 -> empty: skip
    d. S=2, R=1-4 -> empty: skip
3. S=3, R=1 -> not distant: sub-selecting the receiver
    a. S=3, R=1-1 -> distant: computing forces
    b. S=3, R=1-2 -> empty: skip
    c. S=3, R=1-3 -> empty: skip
    d. S=3, R=1-4 -> empty: skip
4. S=4, R=1 -> empty: skip
5. S=1, R=2 -> not distant: sub-selecting the source
    a. S=1-1, R=2 -> distant: computing forces
    b. S=1-2, R=2 -> empty: skip
    c. S=1-3, R=2 -> empty: skip
    d. S=1-4, R=2 -> empty: skip
6. S=2, R=2 -> same, no child: skip
7. S=3, R=2 -> not distant: sub-selecting the source
    a. S=3-1, R=2 -> empty: skip
    b. S=3-2, R=2 -> empty: skip
    c. S=3-3, R=2 -> empty: skip
    d. S=3-4, R=2 -> distant: computing forces
8. S=4, R=2 -> empty: skip
9. S=1, R=3 -> not distant: sub-selecting the receiver
    a. S=1, R=3-1 -> empty: skip
    b. S=1, R=3-2 -> empty: skip
    c. S=1, R=3-3 -> empty: skip
    d. S=1, R=3-4 -> distant: computing forces
10. S=2, R=3 -> not distant sub-selecting the receiver
    a. S=2, R=3-1 -> empty: skip
    b. S=2, R=3-2 -> empty: skip
    c. S=2, R=3-3 -> empty: skip
    d. S=2, R=3-4 -> distant: computing forces
11. S=3, R=3 -> not distant: sub-selecting the receiver
    a. S=3, R=3-1 -> empty: skip
    b. S=3, R=3-2 -> empty: skip
    c. S=3, R=3-3 -> empty: skip
    d. S=3, R=3.4 -> not distant: sub-selecting the source
        i. S=3-1, R=3.4 -> empty: skip
        ii. S=3-2, R=3.4 -> empty: skip
        iii. S=3-3, R=3.4 -> empty: skip
        iv. S=3-4, R=3.4 -> not distant: sub-selecting the receiver
            1. S=3-4, R=3.4-1 -> empty: skip
            2. S=3-4, R=3.4-2 -> empty: skip
            3. S=3-4, R=3.4-3 -> not distant: sub-selecting the source
                a. S=3-4-1, R=3.4-3 -> empty: skip
                b. S=3-4-2, R=3.4-3 -> empty: skip
                c. S=3-4-3, R=3.4-3 -> same, no child: skip
                d. S=3-4-4, R=3.4-3 -> no child: computing forces
            4. S=3-4, R=3-4-4 -> not distant: sub-selecting the source
                a. S=3-4-1, R=3.4-4 -> empty: skip
                b. S=3-4-2, R=3.4-4 -> empty: skip
                c. S=3-4-3, R=3.4-4 -> no child: computing forces
                d. S=3-4-4, R=3.4-4 -> same, no child: skip
12. S=4, R=3 -> empty: skip
13. S=1, R=4 -> empty: skip
14. S=2, R=4 -> empty: skip
15. S=3, R=4 -> empty: skip
16. S=4, R=4 -> empty: skip At the end of all iterations and computing each child square contains the forces generated on it. Therefore, the assessing further comprises distributing, by the computerized data processing unit, the forces acting on each of the receiver square to all of the nodes in the corresponding receiver square defining the gravitational forces of all of the nodes.

In order to extract the forces at each node is enough to start from the lowest level child square that contains the node and proceed upwards adding at each step the force to the node. So, the distributing comprises for each of the node defining the gravitational forces as the forces acting on the corresponding receiver square multiplied by the mass of the node. In particular, the gravitational forces for each of the node is defined starting from the receiver square at lowest level and going up to the parent receiver square at highest level, wherein the gravitational forces of the node are calculated as sum of the forces acting on each of the corresponding receiver square from the lowest level to the highest level multiplied by the mass of the node.

Preferably, the forces acting on each of the receiver square are the two components of the force generated along the x and y axes in the two-dimensional space, computed as:

$$Fx = GMs*(xs-xr)/d^3$$

$$Fy = GMs*(ys-yr)/d^3$$

wherein:
Ms is the source mass,
xs, ys are the coordinates of source center of mass,
xr, yr are the coordinate of receiver center of mass,
d is the distance between the source center of mass and the receiver center of mass,
G is a predefined gravitational constant.

After that, positioning the objects as graph in the GUI based on the gravitational forces of the nodes, as previously calculated, is made. The positioning procedure consists in substantially in defining an initial position for all the nodes and evaluate how the initial positions evolve when the nodes are subjected to some forces, such as the computed gravitational forces. Starting from the initial position the nodes will therefore move and the graph will progressively reach a converged status where the nodes will remain substantially in the same position.

Gravitational forces (repulsive) makes nodes well separated to each other, but further forces may be considered, such as Link forces, Central force and Damping force, wherein the Link forces put connected nodes close each other, the Central force ensures that the graph remain centered in the window of the GUI and does not moves around and the Damping forces avoid oscillations.

In this regard, according to further embodiment, positioning the objects in the GUI based on the gravitational forces of the nodes and on the link forces between couples of the nodes. In that case, the link forces may be computed for each of the couples as:

$$Flx=K(xb-xa)$$

$$Fly=K(yb-ya)$$

and $$Flx=K(xa-xb)$$

$$Fly=K(ya-yb)$$

respectively for an "a" node of the couple and for a "b" node of the couple, wherein:

K is a predefined elastic constant.

In a further embodiment, positioning the objects in the GUI may be based on the gravitational forces of the nodes and on the central forces attracting the nodes toward the origin of the graph. In that case, central forces are computed for each of the nodes as:

$$Fcx=C*x$$

$$Fcy=C*y$$

wherein:

C is a predefined constant.

Moreover, in a further embodiment, positioning the objects in the GUI may be based on the gravitational forces of the nodes and on the damping forces of the nodes. In that case, the damping forces are computed for each of the nodes as:

$$Fdx=D*Vx$$

$$Fdy=D*Vy$$

wherein:

Vx is the velocity of the node along said x axis,

Vy is the velocity of the node along said y axis,

D is a predefined damping constant.

Finally, in a further embodiment, positioning the objects in the GUI may be based on the total forces of each of the nodes as sum of the gravitational forces, of the link forces, of the central forces, of the damping forces, as above described, computed for each of the nodes as:

$$Ftx=Fgx+Flx+Fcx+Fdx$$

$$Fty=Fgy+Fly+Fcy+Fdy$$

In that case, an arbitrary position for the nodes at time to, as well as an initial velocity equal to zero, are set. Gravitational forces are computed, as already described in the method according to the present invention, for each node, defining Fgx and Fgy. Subsequently, Link forces are computed considering the positions of the two nodes involved in each link, defining Flx and Fly. After that, for each node a force that attracts towards the graph origin is calculated, defining Fcx and Fcy. Damping forces are computed adopting a viscous damping model for which damping forces are proportional to velocities and wherein typically D has a value smaller than 1, defining Fdx and Fdy Finally, all the forces acting on a node are summed together obtaining for each node the total forces Ftx and Fty.

In a further embodiment, positioning the objects in the GUI may be computed in a predetermined time interval at each predetermined instant, and wherein a new position of all of the nodes in the instant is determined using the Verlet-Velocity Algorithm based on the total forces. This allows to repeat the calculation of forces, one or more as above described, using the new computed positions.

Figure 2:
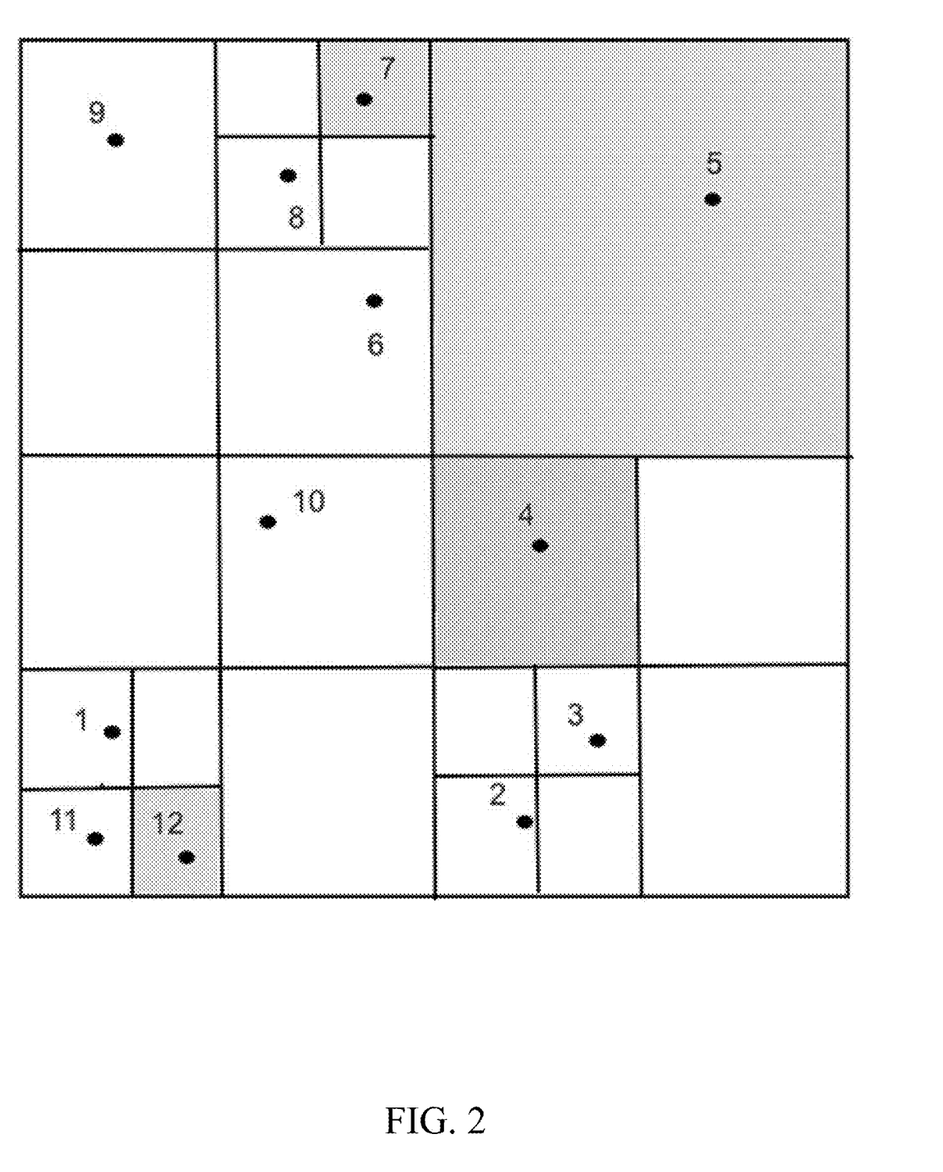
FIG. 2 shows a quadtree of a second example defined according to the present invention.

FIG. 2 illustrates a first example, to be processed according to the method of the present invention, which comprises twelve nodes numbered from 1 to 12. These nodes represent corresponding objects in a network.

This example differs from the one illustrated in FIG. 1 in that a great number of nodes are considered, therefore only the differences with respect to the method according to the present invention will be described in greater details, again considering that either the Naïve approach and the Barnes-Hut approach as well result in a more complex forces evaluation.

The method for representing objects of a network in a GUI according to the present invention allows to reduce more the complexity just to seventy-one forces evaluation.

The method comprises first allocating all of the objects of the network as respective nodes in a two-dimensional space. FIG. 2 illustrates such allocation that will be described in greater details in the following.

The allocating comprises defining, by a computerized data processing unit, the random initial position of all of the nodes assigning to each of the nodes the respective coordinates along the x and y axes in the two-dimensional space. Subsequently, enclosing, by the computerized data processing unit, all of the nodes in a single base square, as represented in the edges of FIG. 2.

The single base square is approached by dividing it in a plurality of $1^{st}$-level squares, again by a computerized data processing unit. Such a plurality of $1^{st}$-level squares consists of four squares having the same dimensions. In particular, the $1^{st}$-level squares are nested in the base square so that they represent children of the same.

After that, the allocating comprises subdividing, by the computerized data processing unit, each of the $1^{st}$-level squares in a plurality of $2^{nd}$-level squares, wherein the subdividing is made for the $1^{st}$-level squares provided with two or more of the nodes. Such a plurality of $2^{nd}$-level squares consists of four squares having the same dimensions.

To simplify the presentation and identification the same notation of the previous example will be adopted. Each child square is defined by a number based on the position with respect to the parent square, wherein notation 1 defines the square in the top left position, notation 2 defines the square in the top right position, the notation 3 defines the square in the bottom right position and notation 4 defines the square in the bottom left position. Moreover, the notation of the parent squares will be maintained at each level. Therefore, the $1^{st}$-level squares are identified with the notation 1, 2, 3 and 4 starting with the $1^{st}$-level squares on the top left going clockwise towards bottom left.

By considering the aforementioned notation, only square 2 will not be subdivided anymore, since the contains just a single node, i.e. node numbered as 5, while all the others will be subdivided, as described, in four more $2^{nd}$-level squares having the same dimensions. In particular, the $2^{nd}$-level squares are nested in the respective $1^{st}$-level squares so that they represent children of the same. Therefore, the $2^{nd}$-level squares are identified with the notation 1-1, 1-2, 1-3 and 1-4, for the $1^{st}$-level square with the notation 1, with the notation 3-1, 3-2, 3-3, 3-4, for the $1^{st}$-level square with the notation 3, and with the notation 4-1, 4-2, 4-3, 4-4, for the $1^{st}$-level square with the notation 4 again starting with the $2^{nd}$-level squares on the top left going clockwise towards bottom left. The nodes being enclosed in the $2^{nd}$-level square with the notation 1-1, i.e. node numbered as 9, in the $2^{nd}$-level square with the notation 1-2, i.e. nodes numbered as 7 and 8, in the $2^{nd}$-level square with the notation 1-3, i.e. node numbered as 6, in the $2^{nd}$-level square with the notation 3-1, i.e. node numbered as 4, in the $2^{nd}$-level square with the notation 3-4, i.e. nodes numbered as 2 and 3, in the $2^{nd}$-level square with the notation 4-2, i.e. node numbered as 10, and in the $2^{nd}$-level square with the notation 4-4, i.e. nodes numbered as 1, 11 and 12.

By iterating the subdividing, each of the $(n)^{th}$-level squares is subdivided in a plurality of $(n+1)^{th}$-level squares, and the iteration is done until the $(n)^{th}$-level squares are provided with two or more nodes.

Preferably, also the plurality of $(n+1)^{th}$-level squares consists of four level squares having the same dimensions. In particular, the $(n+1)^{th}$-level squares are nested in the respective $(n)^{th}$-level squares so that they represent children of the same, the latter consisting in turn of four level squares having the same dimensions nested in the respective $(n-1)^{th}$-level squares so that they represent children of the same, and so on.

In the embodiment illustrated in FIG. 2, the iteration involves only the further subdividing of the $2^{nd}$-level square with the notation 1-2, the $2^{nd}$-level square with the notation 3-4 and the $2^{nd}$-level square with the notation 4-4, being the only $2^{nd}$-level squares provided with two or more nodes. Therefore, square 1-2, square 3-4 and square 4-4 will be subdivided, as described, each in four more $3^{rd}$-level squares having the same dimensions. In particular, the $3^{rd}$-level squares are nested in the respective $2^{nd}$-level squares so that they represent children of the same. Therefore, the $3^{rd}$-level squares are identified with the notation 1-2-1, 1-2-2, 1-2-3 and 1-2-4, for the $2^{nd}$-level square with the notation 1-2, with the notation 3-4-1, 3-4-2, 3-4-3 and 3-4-4, for the $2^{nd}$-level square with the notation 2-4 and with the notation 4-4-1, 4-4-2, 4-4-3, 4-4-4, for the $2^{nd}$-level square with the notation 4-4, again starting with the $3^{rd}$-level squares on the top left going clockwise towards bottom left. The nodes being enclosed in the $3^{rd}$-level square with the notation 1-2-2, i.e. node numbered as 7, in the $3^{rd}$-level square with the notation 1-2-4, i.e. node numbered as 8, in the $3^{rd}$-level square with the notation 3-4-2, i.e. node numbered as 3, in the $3^{rd}$-level square with the notation 3-4-4, i.e. node numbered as 2, in the $3^{rd}$-level square with the notation 4-4-1, i.e. node numbered as 1, in the $3^{rd}$-level square with the notation 4-4-3, i.e. node numbered as 12 and in the $3^{rd}$-level square with the notation 4-4-4, i.e. node numbered as 11.

In this way, the allocating defines a quadtree, as illustrated in FIG. 2, of all nodes from 1 to 12 representing the objects of the network. In particular, the quadtree as defined is not a complete quadtree since not all the parent squares have exactly four nested children squares, the nesting depending of the nodes contained as explained.

After the allocating, the method comprises assessing the gravitational forces of the nodes.

The assessing comprises selecting, by the computerized data processing unit, as source square one of said squares starting from the highest level. Subsequently, the assessing comprises selecting, by the computerized data processing unit, as receiver square one of said squares starting from the highest level. In particular, the assessing is iterated for all of the squares at same level.

To simplify the below description, source squares will be indicated with S followed by the notation that identifies them in the aforementioned quadtree, while receiver squares will be indicated with R followed by the notation that identifies them in the aforementioned quadtree.

Therefore, without taking into account the single base square, the source and the receiver are selected from the $1^{st}$-level squares, considering all possible combinations of source and receiver squares at the Pt level as previously described. In the present example, the selecting starts with the S1 and R1, then with S2-R1, S3-R1, S4-R1, and the S1-R2, S2-R2, S3-R3 and so on until S4-R4.

After selecting, evaluating, by the computerized data processing unit, if the source square and the receiver square are distant is performed. according to one or more predefined criteria.

The evaluation of the distance is made according to one or more predefined criteria. Considering the generated quadtree, it is necessary to define a criterion, or more criteria, that permits to understand when a square that contains sources is enough distant from a square that contains the receivers in such a way that the collapsing of source and receiver can be done with a good approximation in the results.

The predefined criteria comprise the evaluation of the overlap, wherein the squares are considered not distant if they overlap to each other. Moreover, the predefined criteria comprise the evaluation of the edges, wherein the squares are considered not distant if they have at least an edge in common. Furthermore, the predefined criteria comprise the evaluation of the vertexes, wherein the squares are considered not distant if they have at least a vertex in common. Depending on the accuracy desired, such criteria can be taken into consideration jointly, i.e. considering all criteria, or separately, i.e. considering one or more criteria. Moreover, further criteria herewith not described can be considered.

In the present example, the aforementioned criteria will be considered jointly.

The results of the distance evaluation between source and receiver will trigger the subsequent computing or subselecting. In particular, if the source square and the receiver square are evaluated as distant or if the source square and the receiver square are evaluated as not distant but have respectively no lower level squares nested a subsequent computing, by the computerized data processing unit, of the forces acting on the receiver square from the source square is made. On the contrary, if the source square and the receiver square are evaluated as not distant, a sub-selecting, by the computerized data processing unit, as source square or as receiver square one of the squares of a lower level is made, wherein the sub-selecting is again iterated for all of the squares at same level.

The sub-selecting, and the selecting as well, can be done randomly or according to one or more criteria of selection. A criterion of selection may comprise selecting as lower level square the one between source square and receiver square at higher level, if both source square and receiver square have lower level squares nested and are not at the same level. A further criterion may comprise selecting as lower level square the one between source square and receiver square having lower level squares nested if the other has no lower level squares nested. Moreover, a criterion may comprise selecting as lower level square the one between source square and receiver square containing a smaller number of the nodes, if both source square and receiver square have lower level squares nested and are at the same level. Finally, a criterion may comprise selecting as lower level square the receiver square, if both source square and receiver square have lower level squares nested and contain the same number of the nodes. Such criteria of selection can be taken into consideration jointly, i.e. considering all criteria of selection, or separately, i.e. considering one or more criteria of selection. Moreover, further criteria of selection herewith not described can be considered.

In the present example, the aforementioned criteria of selection will be considered jointly.

In the following, a summary of all iteration for the example in FIG. 2 is made.

1. S = 1, R = 1 -> not distant: sub-selecting the receiver
   a. S = 1, R = 1-1 -> not distant: sub-selecting the source
      i. S = 1-1, R = 1-1 -> same no child: skip
      ii. S = 1-2, R = 1-1 -> not distant: sub-selecting the source
         1. S = 1-2-1, R = 1-1 -> empty: skip
         2. S = 1-2-2, R = 1-1 -> distant: computing forces
         3. S = 1-2-3, R = 1-1 -> empty: skip
         4. S = 1-2-4, R = 1-1 -> no child: computing forces
      iii. S = 1-3, R = 1-1 -> no child: computing forces
      iv. S = 1-4, R = 1-1 -> empty: skip
   b. S = 1, R = 1-2 -> not distant: sub-selecting the source
      i. S = 1-1, R = 1-2 -> not distant: sub-selecting the receiver
         1. S = 1-1, R = 1-2-1 -> empty: skip
         2. S = 1-1, R = 1-2-2 -> distant: computing forces
         3. S = 1-1, R = 1-2-3 -> empty: skip
         4. S = 1-1, R = 1-2-4 -> no child: computing forces
      ii. S = 1-2, R = 1-2 -> not distant: sub-selecting the receiver
         1. S = 1-2, R = 1-2-1 -> empty: skip
         2. S = 1-2, R = 1-2-2 -> not distant sub-selecting the source
            a. S = 1-2-1, R = 1-2-2 -> empty: skip
            b. S = 1-2-2, R = 1-2-2 -> same, no child: skip
            c. S = 1-2-3, R = 1-2-2 -> empty: skip
            d. S = 1-2-4, R = 1-2-2 -> no child: computing forces
         3. S = 1-2, R = 1-2-3 -> empty: skip
         4. S = 1-2, R = 1-2-4 -> not distant: sub-selecting the source
            a. S = 1-2-1, R = 1-2-4 -> empty: skip
            b. S = 1-2-2, R = 1-2-4 -> no child: computing forces
            c. S = 1-2-3, R = 1-2-4 -> empty: skip
            d. S = 1-2-4, R = 1-2-4 -> same, no child: skip
      iii. S = 1-3, R = 1-2 -> not distant: sub-selecting the receiver
         1. S = 1-3, R = 1-2-1 -> empty: skip
         2. S = 1-3, R = 1-2-2 -> distant: computing forces
         3. S = 1-3, R = 1-2-3 -> empty: skip
         4. S = 1-3, R = 1-2-4 -> no child: computing forces
      iv. S = 1-4, R = 1-2 -> empty: skip
   c. S = 1, R = 1-3 -> not distant: sub-selecting the source
      i. S = 1-1, R = 1-3 -> no child: compute force
      ii. S = 1-2, R = 1-3 -> not distant: sub-selecting the source
         1. S = 1-2-1, R = 1-3 -> empty: skip
         2. S = 1-2-2, R = 1-3 -> distant: computing forces
         3. S = 1-2-3, R = 1-3 -> empty: skip
         4. S = 1-2-4, R = 1-3 -> no child: computing forces
      iii. S = 1-3, R = 1-3 -> same, no child: skip
      iv. S = 1-4, R = 1-3 -> empty: skip
   d. S = 1, R = 1-4 -> empty: skip
2. S = 2, R = 1 -> not distant: sub-selecting the receiver
   a. S = 2, R = 1-1 -> distant: computing forces
   b. S = 2, R = 1-2 -> not distant: sub-selecting the receiver
      i. S = 2, R = 1-2-1 -> empty: skip
      ii. S = 2, R = 1-2-2 -> no child: computing forces
      iii. S = 2, R = 1-2-3 -> empty: skip
      iv. S = 2, R = 1-2-4 -> distant: computing forces
   c. S = 2, R = 1-3 -> no child: computing forces
   d. S = 2, R = 1-4 -> empty: skip
3. S = 3, R = 1 -> not distant: sub-selecting the source (has less nodes)
   a. S = 3-1, R = 1 -> not distant: sub-selecting the receiver
      i. S = 3-1, R = 1-1 -> distant: computing forces
      ii. S = 3-1, R = 1-2 -> distant: computing forces
      iii. S = 3-1, R = 1-3 -> no child: computing forces
      iv. S = 3-1, R = 1-4 -> empty: skip    b. S = 3-2, R = 1 -> empty: skip
   c. S = 3-3, R = 1 -> empty: skip
   d. S = 3-4, R = 1 -> distant: computing forces
4. S = 4, R = 1 -> not distant: sub-selecting the receiver (same level, same nodes)
   a. S = 4, R = 1-1 -> distant: computing forces
   b. S = 4, R = 1-2 -> distant: computing forces
   c. S = 4, R = 1-3 -> not distant: sub-selecting the source
      i. S = 4-1, R = 1-3 -> empty: skip
      ii. S = 4-2, R = 1-3 -> no child: computing forces
      iii. S = 4-3, R = 1-3 -> empty: skip
      iv. S = 4-4, R = 1-3 -> distant: computing forces
   d. S = 4, R = 1-4 -> empty: skip
5. S = 1, R = 2 -> not distant: sub-selecting the source
   a. S = 1-1, R = 2 -> distant: computing forces
   b. S = 1-2, R = 2 -> not distant: sub-selecting the source
      i. S = 1-2-1, R = 2 -> empty: skip
      ii. S = 1-2-2, R = 2 -> no child: computing forces
      iii. S = 1-2-3, R = 2 -> empty: skip
      iv. S = 1-2-4, R = 2 -> distant: computing forces
   c. S = 1-3, R = 2 -> no child: computing forces
   d. S = 1-4, R = 2 -> empty: skip
6. S = 2, R = 2 -> same, no child: skip
7. S = 3, R = 2 -> not distant: sub-selecting the source
   a. S = 3-1, R = 2 -> no child: computing forces
   b. S = 3-2, R = 2 -> empty: skip
   c. S = 3-3, R = 2 -> empty: skip
   d. S = 3-4, R = 2 -> distant: computing forces
8. S = 4, R = 2 -> not distant: sub-selecting the source
   a. S = 4-1, R = 2 -> empty: skip
   b. S = 4-2, R = 2 -> no child: computing forces
   c. S = 4-3, R = 2 -> empty: skip
   d. S = 4-4, R = 2 -> distant: computing forces
9. S = 1, R = 3 -> not distant: sub-selecting the receiver
   a. S = 1, R = 3-1 -> not distant: sub-selecting the source
      i. S = 1-1, R = 3-1 -> distant: computing forces
      ii. S = 1-2, R = 3-1 -> distant: computing forces
      iii. S = 1-3, R = 3-1 -> no child: computing forces
      iv. S = 1-4, R = 3-1 -> empty: skip
   b. S = 1, R = 3-2 -> empty: skip
   c. S = 1, R = 3-3 -> empty: skip
   d. S = 1, R = 3-4 -> distant: computing forces
10. S = 2, R = 3 -> not distant: go down in receiver
   a. S = 2, R = 3-1 -> no child: computing forces
   b. S = 2, R = 3-2 -> empty: skip
   c. S = 2, R = 3-3 -> empty: skip
   d. S = 2, R = 3-4 -> distant: computing forces
11. S = 3, R = 3 -> not distant: sub-selecting the receiver
   a. S = 3, R = 3-1 -> not distant: sub-selecting the source
      i. S = 3-1, R = 3-1 -> same, no child: skip
      ii. S = 3-2, R = 3-1 -> empty: skip
      iii. S = 3-3, R = 3-1 -> empty: skip
      iv. S = 3-4, R = 3-1 -> not distant: sub-selecting the source
         1. S = 3-4-1, R = 3-1 -> empty: skip
         2. S = 3-4-2, R = 3-1 -> no child: computing forces
         3. S = 3-4-3, R = 3-1 -> empty: skip
         4. S = 3-4-4, R = 3-1 -> no child: computing forces
   b. S = 3, R = 3-2 -> empty: skip
   c. S = 3, R = 3-3 -> empty: skip
   d. S = 3, R = 3-4 -> not distant: sub-selecting the source
      i. S = 3-1, R = 3-4 -> not distant: sub-selecting the receiver
         1. S = 3-1, R = 3-4-1 -> empty: skip
         2. S = 3-1, R = 3-4-2 -> no child: computing forces
         3. S = 3-1, R = 3-4-3 -> empty: skip
         4. S = 3-1, R = 3-4-4 -> distant: computing forces
      ii. S = 3-2, R = 3-4 -> empty: skip
      iii. S = 3-3, R = 3-4 -> empty: skip
      iv. S = 3-4, R = 3-4 -> not distant: sub-selecting the source
         1. S = 3-4-1, R = 3-4 -> empty: skip
         2. S = 3-4-2, R = 3-4 -> not distant: sub-selecting the receiver
            a. S = 3-4-2, R = 3-4-1 -> empty: skip
            b. S = 3-4-2, R = 3-4-2 -> same, no child: skip
            c. S = 3-4-2, R = 3-4-3 -> empty: skip
            d. S = 3-4-2, R = 3-4-4 -> no child: computing forces
         3. S = 3-4-3, R = 3-4 -> empty: skip 4. S = 3-4-4, R = 3-4 -> not distant: sub-selecting the receiver
       a. S = 3-4-4, R = 3-4-1 -> empty: skip
       b. S = 3-4-4, R = 3-4-2 -> no child: computing forces
       c. S = 3-4-4, R = 3-4-3 -> empty: skip
       d. S = 3-4-4, R = 3-4-4 -> same, no child: skip
12. S = 4, R = 3 -> not distant: sub-selecting the receiver
    a. S = 4, R = 3-1 -> not distant: sub-selecting the source
       i. S = 4-1, R = 3-1 -> empty: skip
       ii. S = 4-2, R = 3-1 -> no child: computing forces
       iii. S = 4-3, R = 3-1 -> empty: skip
       iv. S = 4-4, R = 3-1 -> distant: computing forces
    b. S = 4, R = 3-2 -> empty: skip
    c. S = 4, R = 3-3 -> empty: skip
    d. S = 4, R = 3-4 -> not distant: sub-selecting the source
       i. S = 4-1, R = 3-4 -> empty: skip
       ii. S = 4-2, R = 3-4 -> not distant: sub-selecting the receiver
          1. S = 4-2, R = 3-4-1 -> empty: skip
          2. S = 4-2, R = 3-4-2 -> distant: computing forces
          3. S = 4-2, R = 3-4-3 -> empty: skip
          4. S = 4-2, R = 3-4-4 -> distant: computing forces
       iii. S = 4-3, R = 3-4 -> empty: skip
       iv. S = 4-4, R = 3-4 -> distant: computing forces
13. S = 1, R = 4 -> not distant: sub-selecting the receiver
    a. S = 1, R = 4-1 -> empty: skip
    b. S = 1, R = 4-2 -> not distant: sub-selecting the source
       i. S = 1-1, R = 4-2 -> distant: computing forces
       ii. S = 1-2, R = 4-2 -> distant: computing forces
       iii. S = 1-3, R = 4-2 -> no child: computing forces
       iv. S = 1-4, R = 4-2 -> empty: skip
    c. S = 1, R = 4-3 -> empty: skip
    d. S = 1, R = 4-4 -> distant: computing forces
14. S = 2, R = 4 -> not distant: sub-selecting the receiver
    a. S = 2, R = 4-1 -> empty: skip
    b. S = 2, R = 4-2 -> no child: computing forces
    c. S = 2, R = 4-3 -> empty: skip
    d. S = 2, R = 4-4 -> distant: computing forces
15. S = 3, R = 4 -> not distant: sub-selecting the source
    a. S = 3, R = 4-1 -> empty: skip
    b. S = 3, R = 4-2 -> not distant: sub-selecting the source
       i. S = 3-1, R = 4-2 -> no child: computing forces
       ii. S = 3-2, R = 4-2 -> empty: skip
       iii. S = 3-3, R = 4-2 -> empty: skip
       iv. S = 3-4, R = 4-2 -> not distant: sub-selecting the source
          1. S = 3-4-1, R = 4-2 -> empty: skip
          2. S = 3-4-2, R = 4-2 -> distant: computing forces
          3. S = 3-4-3, R = 4-2 -> empty: skip
          4. S = 3-4-4, R = 4-2 -> distant: computing forces
    c. S = 3, R = 4-3 -> empty: skip
    d. S = 3, R = 4-4 -> distant: computing forces
16. S = 4, R = 4 -> not distant: sub-selecting the receiver
    a. S = 4, R = 4-1 -> empty: skip
    b. S = 4, R = 4-2 -> not distant: sub-selecting the source
       i. S = 4-1, R = 4-2 -> empty: skip
       ii. S = 4-2, R = 4-2 -> same, no child: skip
       iii. S = 4-3, R = 4-2 -> empty: skip
       iv. S = 4-4, R = 4-2 -> not distant: sub-selecting the source
          1. S = 4-4-1, R = 4-2 -> distant: computing forces
          2. S = 4-4-2, R = 4-2 -> empty: skip
          3. S = 4-4-3, R = 4-2 -> distant: computing forces
          4. S = 4-4-4, R = 4-2 -> distant: computing forces
    c. S = 4, R = 4-3 -> empty: skip
    d. S = 4, R = 4-4 -> not distant: sub-selecting the source
       i. S = 4-1, R = 4-4 -> empty: skip
       ii. S = 4-2, R = 4-4 -> not distant: sub-selecting the receiver
          1. S = 4-2, R = 4-4-1 -> distant: computing forces
          2. S = 4-2, R = 4-4-2 -> empty: skip
          3. S = 4-2, R = 4-4-3 -> distant: computing forces
          4. S = 4-2, R = 4-4-4 -> distant: computing forces
       iii. S = 4-3, R = 4-4 -> empty: skip
       iv. S = 4-4, R = 4-4 -> not distant: sub-selecting the receiver
          1. S = 4-4, R = 4-4-1 -> not distant sub-selecting the source
             a. S = 4-4-1, R = 4-4-1 -> same, no child: skip
             b. S = 4-4-2, R = 4-4-1 -> empty: skip
             c. S = 4-4-3, R = 4-4-1 -> no child: computing forces
             d. S = 4-4-4, R = 4-4-1 -> no child: computing forces
          2. S = 4-4, R = 4-4-2 -> empty: skip
          3. S = 4-4, R = 4-4-3 -> not distant: sub-selecting the source
             a. S = 4-4-1, R = 4-4-3 -> no child: computing forces
             b. S = 4-4-2, R = 4-4-3 -> empty: skip
             c. S = 4-4-3, R = 4-4-3 -> same, no child: skip
             d. S = 4-4-4, R = 4-4-3 -> no child: computing forces
          4. S = 4-4, R = 4-4-4 -> not distant: sub-selecting the source
             a. S = 4-4-1, R = 4-4-4 -> no child: computing forces
             b. S = 4-4-2, R = 4-4-4 -> empty: skip
             c. S = 4-4-3, R = 4-4-4 -> no child: computing forces
             d. S = 4-4-4, R = 4-4-4 -> same, no child: skip As expected, the number of force evaluation is seventy-one, [S=1-2-2, R=1-1], [S=1-2-4, R=1-1], [S=1-3, R=1-1], [S=1-1, R=1-2-2], [S=1-1, R=1-2-4], [S=1-2-4, R=1-2-2], [S=1-2-2, R=1-2-4], [S=1-3, R=1-2-2], [S=1-3, R=1-2-4], [S=1-1, R=1-3], [S=1-2-2, R=1-3], [S=1-2-4, R=1-3], [S=2, R=1-1], [S=2, R=1-2-2], [S=2, R=1-2-4], [S=2, R=1-3], [S=3-1, R=1-1], [S=3-1, R=1-2], [S=3-1, R=1-3], [S=3-4, R=1], [S=4, R=1-1], [S=4, R=1-2], [S=4-2, R=1-3], [S=4-4, R=1-3], [S=1-1, R=2], [S=1-2-2, R=2], [S=1-2-4, R=2], [S=1-3, R=2], [S=3-1, R=2], [S=3-4, R=2], [S=4-2, R=2], [S=4-4, R=2], [S=1-1, R=3-1], [S=1-2, R=3-1], [S=1-3, R=3-1], [S=1, R=3-4], [S=2, R=3-1], [S=2, R=3-4], [S=3-4-2, R=3-1], [S=3-4-4, R=3-1], [S=3-1, R=3-4-2], [S=3-1, R=3-4-4], [S=3-4-2, R=3-4-4], [S=3-4-4, R=3-4-2], [S=4-2, R=3-1], [S=4-4, R=3-1], [S=4-2, R=3-4-2], [S=4-2, R=3-4-4], [S=4-4, R=3-4], [S=1-1, R=4-2], [S=1-2, R=4-2], [S=1-3, R=4-2], [S=1, R=4-4], [S=2, R=4-2], [S=2, R=4-4], [S=3-1, R=4-2], [S=3-4-2, R=4-2], [S=3-4-4, R=4-2], [S=3, R=4-4], [S=4-4-1, R=4-2], [S=4-4-3, R=4-2], [S=4-4-4, R=4-2], [S=4-2, R=4-4-1], [S=4-2, R=4-4-3], [S=4-2, R=4-4-4], [S=4-4-3, R=4-4-1], [S=4-4-4, R=4-4-1], [S=4-4-1, R=4-4-3], [S=4-4-4, R=4-4-3], [S=4-4-1, R=4-4-4], [S=4-4-3, R=4-4-4].

At the end of all iterations and computing each child square contains the forces generated on it. Therefore, the assessing further comprises distributing, by the computerized data processing unit, the forces acting on each of the receiver square to all of the nodes in the corresponding receiver square defining the gravitational forces of all of the nodes.

In order to extract the forces at each node is enough to start from the lowest level child square that contains the node and proceed upwards adding at each step the force to the node. So, the distributing comprises for each of the node defining the gravitational forces as the forces acting on the corresponding receiver square multiplied by the mass of the node. In particular, the gravitational forces for each of the node is defined starting from the receiver square at lowest level and going up to the parent receiver square at highest level, wherein the gravitational forces of the node are calculated as sum of the forces acting on each of the corresponding receiver square from the lowest level to the highest level multiplied by the mass of the node.

Preferably, the forces acting on each of the receiver square are the two components of the force generated along the x and y axes in the two-dimensional space, computed as:

$$Fx = G\, Ms^*(xs-xr)/d^{\wedge}3$$

$$Fy = G\, Ms^*(ys-yr)/d^{\wedge}3$$

wherein:
Ms is the source mass,
xs, ys are the coordinates of source center of mass,
xr, yr are the coordinate of receiver center of mass,
d is the distance between the source center of mass and the receiver center of mass,
G is a predefined gravitational constant.

After that, positioning the objects as graph in the GUI based on the gravitational forces of the nodes, as previously calculated, is made. The positioning procedure consists in substantially in defining an initial position for all the nodes and evaluate how the initial positions evolve when the nodes are subjected to some forces, such as the computed gravitational forces. Starting from the initial position the nodes will therefore move and the graph will progressively reach a converged status where the nodes will remain substantially in the same position.

Gravitational forces (repulsive) makes nodes well separated to each other, but further forces may be considered, such as Link forces, Central force and Damping force, wherein the Link forces put connected nodes close each other, the Central force ensures that the graph remain centered in the window of the GUI and does not moves around and the Damping forces avoid oscillations. Such forces may be calculated according to further embodiments, as described in the previous example of FIG. 1.

The present invention describes, therefore, a method capable to represent an overall network in each iteration using a small part of computational resources.

In particular, the method according to the present invention ensures that each iteration is as fast as possible in such a way to have a responsive graph in the GUI.

The invention claimed is:

1. A method for representing objects of a network in a GUI comprising:
    allocating all of said objects of said network as respective nodes in a two-dimensional space;
    assessing the gravitational forces of said nodes; and
    positioning said objects as graph in said GUI based on said gravitational forces of said nodes;
    wherein said allocating comprises:
        defining, by a computerized data processing unit, the random initial position of all of said nodes assigning to each of said nodes the respective coordinates along the x and y axes in said two-dimensional space;
        enclosing, by said computerized data processing unit, all of said nodes in a single base square;
        dividing, by said computerized data processing unit, said single base square in a plurality of $1^{st}$-level squares, wherein said plurality of $1^{st}$-level squares consists of four level squares having the same dimensions;
        subdividing, by said computerized data processing unit, each of said $1^{st}$-level squares in a plurality of $2^{nd}$-level squares, wherein said subdividing is made for said $1^{st}$-level squares provided with two or more of said nodes and wherein each of said plurality of $2^{nd}$-level squares consists of four level squares having the same dimensions;
        iterating, by said computerized data processing unit, said subdividing of each of said $(n)^{th}$-level squares in a plurality of $(n+1)^{th}$-level squares, wherein said subdividing is made for said $(n)^{th}$-level squares provided with two or more of said nodes and wherein each of said plurality of $(n+1)^{th}$-level squares consists of four level squares having the same dimensions;
    wherein said assessing comprises:
        selecting, by said computerized data processing unit, as source square one of said squares starting from the highest level;
        selecting, by said computerized data processing unit, as receiver square one of said squares starting from the highest level;
        evaluating, by said computerized data processing unit, if said source square and said receiver square are distant, according to one or more predefined criteria;
        computing, by said computerized data processing unit, the forces acting on said receiver square from said source square, if said source square and said receiver square are evaluated as distant or if said source square and said receiver square are evaluated as not distant and have respectively no lower level squares nested;
        sub-selecting, by said computerized data processing unit, as source square or as receiver square one of said squares of a lower level if said source square and said receiver square are evaluated as not distant, wherein said sub-selecting is iterated for all combinations of said squares at same level as source and as receiver for all of said levels;
    wherein said assessing is iterated for all combinations of said squares at the $1^{st}$ level as source and as receiver; and wherein said assessing further comprises distributing, by said computerized data processing unit, said forces acting on each of said receiver square to all of said nodes in said corresponding receiver square defining said gravitational forces of all of said nodes.

2. The method for representing objects of a network in a GUI according to claim 1, wherein said predefined criteria comprise the evaluation of the overlap, wherein said squares are considered not distant if they overlap to each other.

3. The method for representing objects of a network in a GUI according to claim 1, wherein said predefined criteria comprise the evaluation of the edges, wherein said squares are considered not distant if they have at least an edge in common.

4. The method for representing objects of a network in a GUI according to claim 1, wherein said predefined criteria comprise the evaluation of the vertexes, wherein said squares are considered not distant if they have at least a vertex in common.

5. The method for representing objects of a network in a GUI according to claim 1, wherein said forces acting on each of said receiver square are the two components of the force generated along the x and y axes in said two-dimensional space, computed as:

$$Fx=GMs*(xs-xr)/d^3$$

$$Fy=GMs*(ys-yr)/d^3$$

wherein:
    Ms is the source mass,
    xs, ys are the coordinates of source center of mass,
    xr, yr are the coordinate of receiver center of mass,
    d is the distance between said source center of mass and said receiver center of mass,
    G is a predefined gravitational constant.

6. The method for representing objects of a network in a GUI according to claim 1, wherein said distributing comprises for each of said node defining said gravitational forces as the forces acting on said corresponding receiver square multiplied by the mass of said node.

7. The method for representing objects of a network in a GUI according to claim 6, wherein said gravitational forces for each of said node are defined starting from said receiver square at lowest level and going up to the parent receiver square at highest level,
    wherein said gravitational forces of said node are calculated as sum of the forces acting on each of said corresponding receiver square from said lowest level to said highest level multiplied by the mass of said node.

8. The method for representing objects of a network in a GUI according to claim 1, wherein said sub-selecting comprises selecting as lower level square the one between source square and receiver square at higher level, if both source square and receiver square have lower level squares nested and are not at the same level.

9. The method for representing objects of a network in a GUI according to claim 1, wherein said sub-selecting comprises selecting as lower level square the one between source square and receiver square having lower level squares nested if the other has no lower level squares nested.

10. The method for representing objects of a network in a GUI according to claim 1, wherein said sub-selecting comprises selecting as lower level square the one between source square and receiver square containing less number of said nodes, if both source square and receiver square have lower level squares nested and are at the same level.

11. The method for representing objects of a network in a GUI according to claim 1, wherein said sub-selecting comprises selecting as lower level square said receiver square, if both source square and receiver square have lower level squares nested and contain the same number of said nodes.

12. The method for representing objects of a network in a GUI according to claim 1, wherein said positioning said objects in said GUI is based on said gravitational forces of said nodes and on the link forces between couples of said nodes.

13. The method for representing objects of a network in a GUI according to claim 12, wherein said link forces are computed for each of said couples as:

$$Flx=K(xb-xa)$$

$$Fly=K(yb-ya)$$

and $$Flx=K(xa-xb)$$

$$Fly=K(ya-yb)$$

respectively for an "a" node of said couple and for a "b" node of said couple, wherein:
K is a predefined elastic constant;
xa, xb are the respective coordinates along the x axis of nodes "a" and "b";
ya, yb are the respective coordinates along the y axis of nodes "a" and "b".

14. The method for representing objects of a network in a GUI according to claim 1, wherein said positioning said objects in said GUI is based on said gravitational forces of said nodes and on the central forces attracting said nodes toward the origin of said graph.

15. The method for representing objects of a network in a GUI according to claim 14, wherein said central forces are computed for each of said nodes as:

$$Fcx=C*x$$

$$Fcy=C*y$$

wherein:
C is a predefined constant;
x is the coordinate along the x axis of a node;
y is the coordinate along the y axis of a node.

16. The method for representing objects of a network in a GUI according to claim 1, wherein said positioning said objects in said GUI is based on said gravitational forces of said nodes and on the damping forces of said nodes.

17. The method for representing objects of a network in a GUI according to claim 16, wherein said damping forces are computed for each of said nodes as:

$$Fdx=D*Vx$$

$$Fdy=D*Vy$$

wherein:
Vx is the velocity of said node along said x axis,
Vy is the velocity of said node along said y axis,
D is a predefined damping constant.

18. The method for representing objects of a network in a GUI according to claim 12, wherein said positioning said objects in said GUI is based on the total forces (Ftx, Fty) of each of said nodes as sum of said gravitational forces, of said link forces, of said central forces, of said damping forces computed for each of said nodes as:

$$Ftx=Fx+Flx+Fcx+Fdx$$

$$Fty=Fy+Fly+Fcy+Fdy$$

wherein:
Fx, Fy are gravitational forces,
Flx, Fly are link forces,
Fcx, Fcy are central forces,
Fdx, Fdy are damping forces.

19. The method for representing objects of a network in a GUI according to claim 18, wherein said positioning said objects in said GUI is computed in a predetermined time interval at each predetermined instant, and
wherein a new position of all of said nodes in said instant is determined using the Verlet-Velocity Algorithm based on said total forces.

* * * * *

UNITED STATES PATENT AND TRADEMARK OFFICE
CERTIFICATE OF CORRECTION

PATENT NO. : 11,388,065 B1
APPLICATION NO. : 17/187821
DATED : July 12, 2022
INVENTOR(S) : Paolo Di Francescantonio et al.

It is certified that error appears in the above-identified patent and that said Letters Patent is hereby corrected as shown below:

On the Title Page

Item [54] and in the Specification Column 1, Line 1, Title should read, "METHOD FOR REPRESENTING OBJECTS OF A NETWORK IN A GUI."

Signed and Sealed this
Twenty-eighth Day of March, 2023

Katherine Kelly Vidal
*Director of the United States Patent and Trademark Office*